(12) United States Patent  (10) Patent No.: US 8,990,117 B2
Smith                      (45) Date of Patent:     Mar. 24, 2015

(54) SMARTCARD TO VIRTUAL MEDIA CONVERSION

(71) Applicant: Cubic Corporation, San Diego, CA (US)

(72) Inventor: Gavin R. Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/334,531

(22) Filed: Jul. 17, 2014

(65) Prior Publication Data

US 2015/0026071 A1    Jan. 22, 2015

Related U.S. Application Data

(60) Provisional application No. 61/847,934, filed on Jul. 18, 2013.

(51) Int. Cl.
G06Q 20/00 (2012.01)
G06Q 20/34 (2012.01)

(52) U.S. Cl.
CPC .......... *G06Q 20/341* (2013.01); *G06Q 20/3572* (2013.01)
USPC ............... 705/50; 705/13; 705/65; 705/39

(58) Field of Classification Search
None
See application file for complete search history.

(56) References Cited

U.S. PATENT DOCUMENTS

| 4,825,054 | A | | 4/1989 | Rust et al. |
| 5,796,083 | A | * | 8/1998 | Kenneth et al. ............... 235/380 |
| 5,854,477 | A | | 12/1998 | Kawaji et al. |
| 7,103,575 | B1 | * | 9/2006 | Linehan ......................... 705/64 |
| 2003/0010827 | A1 | | 1/2003 | Hilton et al. |
| 2004/0178260 | A1 | | 9/2004 | Scarafile et al. |
| 2008/0156873 | A1 | * | 7/2008 | Wilhelm et al. ............. 235/384 |
| 2012/0112878 | A1 | | 5/2012 | Macklin et al. |

FOREIGN PATENT DOCUMENTS

EP    0784290 A2    7/1997
EP    0784290 A3    1/2000

OTHER PUBLICATIONS

ISR/WO mailed on Dec. 19, 2014 for International Patent Application PCT/US2014/047268 filed on Jul. 18, 2014, all pages.

(Continued)

*Primary Examiner* — Calvin L Hewitt, II
*Assistant Examiner* — Isidora Iluonakhamhe
(74) *Attorney, Agent, or Firm* — Kilpatrick Townsend & Stockton LLP

(57) ABSTRACT

In one embodiment, a method for converting a smartcard into a virtual media in a transit system is provided. The method includes reading data from a smartcard. The data includes product information related to a transit product stored on the smartcard. The data is communicated to a smartcard management system such that the smartcard management system may create a record of the smartcard. The data is also communicated to a ticket management system. An indication of the creation of an account from the ticket management system is received. The account includes a unique account identifier and the data. An input from a contactless media is received. The input includes an identifier of the contactless media. The identifier is communicated to an authorization service. A token created by the authorization service is received. The token is associated with the identifier. The token is communicated to the ticket management system.

18 Claims, 4 Drawing Sheets

(56) References Cited

OTHER PUBLICATIONS

Wikipedia: "Automated teller machine", *Internet Article*, Jun. 20, 2013, XP055156927, Retrieved from the Internet: URL:http://en.wikipedia.org/w/index.php?title=Automated_teller_machine&oldid=560778680 [retrieved on Dec. 5, 2014], all pages.
Wikipedia: "Contactless payment", *Internet Article*, Jul. 10, 2013, XP055157198, Retrieved from the Internet: URL: http://en.wikipedia.org/w/index.php?title=Contactless_payment&oldid=563721310 . [Retrieved on Dec. 8, 2014], all pages.
Wolfgang, et al., "Chapter 17 —Smart Card Terminals" *Smart Card Handbook*, $4^{th}$ Edition. Jul. 19, 2010, Wiley, XP055156980, ISBN: 978-0-47-074367-6. pp. 735-746.
Wikipedia: "Oyster Card", *Internet Article,* Jul. 10, 2013, XP055156909. Retrieved from the Internet: URL:http://en.wikipedia.org/w/index.php?title=Oyster_car&oldid=563712423. [Retrieved on Dec. 5, 2014], all pages.
Wikipedia, "Payment Card", Internet Article, May 10 2013, XP055156933, Retrieved from the Internet: URL:http://en.wikipedia.org/w/index.php?title=Payment_card&oldid=554417994. [Retrieved on Dec. 5, 2014], all pages.
Anonymous, "Ticket Gate Workings", *Internet Article,* Jul. 19, 2009, XP055156952. Retrieved from the Internet: URL:http://districtdavesforum.co.uk/thread/11290/ticket-gate-workings. [Retrieved on Dec. 5, 2014], all pages.
Time Out Guides Ltd, "Time Out London $20^{th}$ Edition: Official Travel Guide The London 2012 Olympic Games and Paralympic Games", Feb. 2, 2012, Time Out, XP055156908. ISBN: 978-1-84-670287-7. pp. 365-365.

\* cited by examiner

SMARTCARD TO VIRTUAL MEDIA CONVERSION

CROSS-REFERENCES TO RELATED APPLICATIONS

This nonprovisional application claims priority from U.S. Provisional Application No. 61/847,934, filed on Jul. 18, 2013, the complete disclosure of which is herein incorporated by reference.

BACKGROUND OF THE INVENTION

In a busy smart-card enabled transport authority, there may be millions of passengers with season tickets and stored value loaded on their smartcards. Many transit authorities are switching to contactless media. When a transit authority decides to switch to contactless credit cards, it must provide those millions of passengers with a system to switch to the new ticketing media. It is expensive for transit operators to manage multiple ticket media schemes: magnetic, barcode, smartcard, payment cards, and the like. Thus, migrating passengers to a single media can be beneficial. Helping passengers transfer their existing transit products from an old media to a new one is normally a time consuming process that requires staff assistance. The amount of time and cost necessary to complete this transition can be very large.

Additionally, transit passengers may carry multiple forms of contactless media. For example, many passengers may carry a transit smartcard as well as a contactless credit card. When both cards are in close proximity, such as when in a passenger's wallet, signals from the cards clash, preventing the user from gaining access to the transit system. Thus, users having both a smartcard and a contactless media must remove the desired card from their wallet, adding to the boarding time. Embodiments of the invention may provide solutions to these and other problems.

BRIEF SUMMARY OF THE INVENTION

Techniques are disclosed herein for converting a smartcard into a virtual media. Embodiments allow for the virtual media to embody a contactless media, such as a contactless credit card. This can, for example, enable a user to eliminate smartcards and instead carry a single contactless media. The user is then able to keep the contactless media in a wallet and still gain access to a transit system, speeding up the boarding process. Other embodiments may utilize other media for access to the transit system.

In one embodiment, a method for converting a smartcard into a virtual media in a transit system is provided. The method may include reading data from a smartcard. The data may include product information related to a transit product stored on the smartcard. The method may also include communicating the data to a smartcard management system such that the smartcard management system may create a record of the smartcard. The data may be communicated to a ticket management system. The method may further include receiving an indication of the creation of an account from the ticket management system. The account may include a unique account identifier and the data. The method may also include receiving an input from a contactless media. The input may include an identifier of the contactless media. The method may further include communicating the identifier to an authorization service and receiving a token created by the authorization service. The token may be associated with the identifier. The token may be communicated to the ticket management system.

In another embodiment, a non-transitory computer-readable medium having instructions embedded thereon for converting a barcode media into a magnetic stripe media in a transit system is provided. The instructions may include computer code for causing a computing device to read data from a smartcard. The data may include product information related to a transit product stored on the smartcard. The computer code may cause the computing device to communicate the data to a smartcard management system such that the smartcard management system may create a record of the smartcard. The computer code may also cause the computing device to communicate the data to a ticket management system and receive an indication of the creation of an account from the ticket management system. The account may include a unique account identifier and the product information. The computer code may further cause the computing device to receive an input from a contactless media. The input may include an identifier of the contactless media. The computer code may also cause the computing device to communicate the identifier to an authorization service and receive a token created by the authorization service. The token may be associated with the identifier. The computer code may also cause the computing device to communicate the token to the ticket management system.

In another embodiment, a system for converting a smartcard into a virtual media in a transit system is provided. The system may include a smartcard reader configured to read data stored on a smartcard. The data may include product information related to a transit product stored on the smartcard. The system may also include a contactless media reader and a processor configured to receive the data from the smartcard. The processor may also be configured to communicate the data to a smartcard management system such that the smartcard management system may create a record of the smartcard being erased as well as communicate the data to a ticket management system. The processor may be further configured to receive an indication of the creation of an account from the ticket management system. The account may include a unique identifier and the product information. The processor may also be configured to receive an input from the contactless media using the contactless media reader. The input may include an identifier of the contactless media. The processor may be further configured to communicate the identifier to an authorization service and receive a token created by the authorization service. The token may be associated with the identifier. The processor may also be configured to communicate the token to the ticket management system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
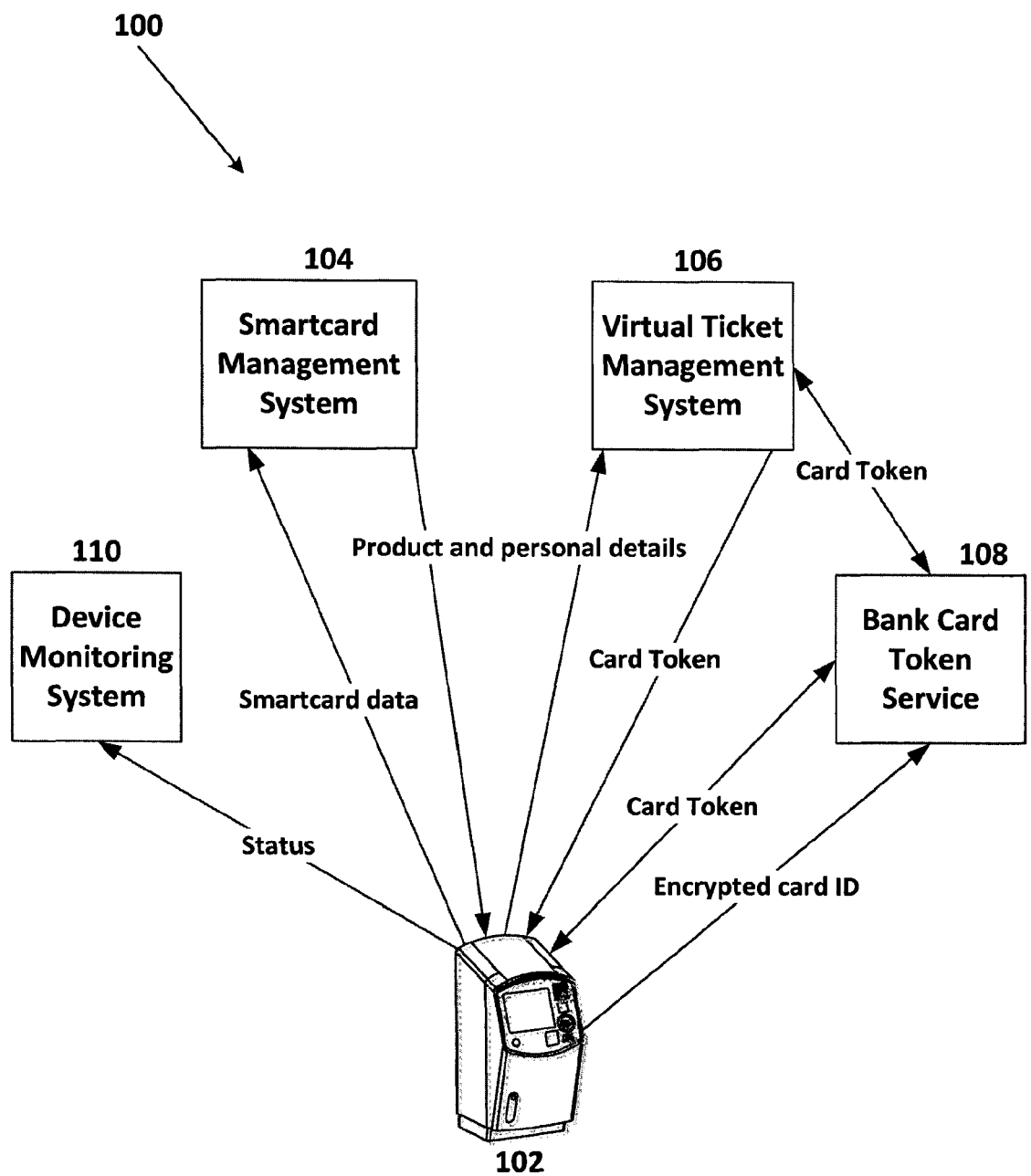
FIG. 1 is a system diagram of a system for converting a smartcard to virtual media, according to embodiments of the invention.

For the purposes of explanation, the ensuing numerous provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the present invention are directed toward automatically converting smartcard based transit ticket products into virtual products associated with a contactless credit card (or other media) and retaining the old smartcard. These functions may all be completed without human assistance by using a converter. A passenger may insert a smartcard into a converter, touch a contactless media, such as a contactless credit card, to the converter, and the converter may associate any transit products on the smartcard with a virtual account accessible using the contactless media. Embodiments of the invention provide transit operators with system and methods to reduce the number of systems for different fare media types, thus reducing operating costs. While discussed primarily in conjunction with transit applications, it will be appreciated that smartcard to virtual media conversions may be used in any other field where both forms of media may be used.

In one embodiment, a system for converting a smartcard into a virtual media in a transit system is provided. The system may include a smartcard reader configured to read data stored on a smartcard. The data may include product information related to a transit product stored on the smartcard. Product information related to a transit product may include a type of fare or pass of the transit product, a value of the transit product, a time and/or date of purchase of the transit product, an expiration date of the transit product, a valid date range of the transit product, and/or any other information related to the transit product. In some embodiments, the smartcard reader may also be configured to receive and retain a smartcard. The smartcard reader may transport the smartcard to a retention bin where used smartcards are collected for recycling.

The system may also include a contactless media reader that is configured to read data stored on a contactless media. Contactless media may include contactless payment cards, such as contactless credit cards, mobile devices, radio frequency (RF) devices, and other contactless devices. In some embodiments, the contactless media includes an identifier, such as a number, that may be read by the contactless media reader. The contactless media may be configured to stored data related to transit purchases. For example, a writing module may write or encode data onto a portion of the contactless media. In some embodiments, the contactless media may be configured to be associated to a transit account using the identifier.

The system may also include a processor configured to receive the data from the smartcard. The data from the smartcard may be stored in a memory of the system for later use. For example, the processor may also be configured to communicate the data read from the smartcard to a smartcard management system. The smartcard management system may then create a record of the smartcard. In some embodiments, the system will erase the data on the smartcard. In these embodiments, the record of the smartcard may include an indication that the smartcard has been erased. In some embodiments, the smartcard management system may communicate information related to the smartcard data back to the system. For example, the smartcard management system may include personal information, such as a name and/or address of the owner of the smartcard.

In some embodiments, the processor may also communicate the data from the smartcard and/or personal information from the smartcard management system to a ticket management system. The ticket management system may create a virtual account containing this data. The processor may be further configured to receive an indication of the creation of the virtual account from the ticket management system. The account may include a unique identifier assigned by the ticket management system, as well as the product information from the smartcard data.

The processor may also be configured to receive an input from the contactless media using the contactless media reader. The input may include an identifier of the contactless media that may be communicated to an authorization service. The identifier may be a number, such as a credit card number of a contactless credit card. The processor may be further configured to receive a token created by the authorization service. The token may be associated with the identifier and act as an alternative secure form of identification of the contactless media. The processor may also be configured to communicate the token to the ticket management system.

FIG. 1 depicts a system 100 for converting smartcards into virtual media. System 100 may include converter 102 that may be located at a transit station or any other convenient location. Converter 102 may be communicatively coupled with a smartcard management system 104. In some embodiments, the converter 102 reads data from a smartcard that has been inserted into the converter 102. The converter 102 may communicate the data from the smartcard to the smartcard management system 104. This data may include product information related to a transit product, such as a type of fare or pass represented by the transit product, a value of the transit product, a time and/or date of purchase of the transit product, an expiration date of the transit product, a valid date range of the transit product, a transaction history of the smartcard, and/or any other information related to the transit product and/or the smartcard. In some embodiments, data from more than one transit product may be stored on a smartcard. For example, a smartcard may include a season pass, a zonal and/or local pass, and/or stored value transit fare. This is particularly effective for users that mostly utilize transit in a particular zone, but enjoy the flexibility of traveling outside that zone without purchasing a new pass each time they make a trip outside of the zone. In some embodiments, the data on the smartcard may be erased by the converter 102. In such embodiments, an indication that the smartcard has been erased and/or is no longer usable may be communicated to the smartcard management system 104.

In some embodiments, the smartcard management system 104 may communicate any information associated with the smartcard that is stored on the smartcard management system 104 to the converter 102. For example, personal information, such as a name and address of the owner of the smartcard, may be passed to the converter 102. Oftentimes, the smartcards includes only product information, without any personal information. By transmitting the personal information stored in the smartcard management system 104 to the converter 102, the converter has access to any information necessary to create a virtual account. This enables the converter 102 to conduct the conversion and account creation processes with minimal to no user input.

The converter 102 may communicate the product data from the smartcard and/or any of the information received from the smartcard management system 104 to a virtual ticket management system 106. The virtual ticket management system 106 may create an account that includes at least some of this data and/or information. The account may include any transit products stored on the smartcard. In some embodiments, the account may also include the personal information from the smartcard management system 104. In some embodiments, the virtual ticket management system 106 may assign an account number or other identifier to the account.

Converter 102 may include a contactless media reader that is configured to receive an input from a contactless media. For example, a contactless credit card may be read by the contactless media reader. Information, including an identifier of the contactless media, may be communicated to a bank card token service 108. In some embodiments, the identifier may be a credit card number. The bank card token service 108 may be a financial institution, such as a bank and/or the issuer of the contactless media. In some embodiments, the identifier of the contactless media may be encrypted by the converter 102 prior to communicating the identifier to the bank card token service 108 to ensure that the identifier is secure. The bank card token service 108 may generate or otherwise assign a unique number or other unique token to the contactless media that is different from the identifier of the contactless media. This number or token may be communicated to the virtual ticket management system 106 directly by the bank card token service 108 and/or by first communicating the token to the converter 102 which may then communicate the token to the virtual ticket management system 106. The virtual ticket management system 106 may then associate the token with the newly created account.

In some embodiments, the only part of system 100 that has access to both the contactless media identifier and the token is the bank card token service 108. The converter 102 may not store a copy of the contactless media identifier after the identifier is transmitted to the bank card token service 108, and the virtual ticket management system 106 may never receive the contactless media identifier. This maintains the security of the contactless media identifier, as the bank card token service 108 is typically a highly secure, encrypted banking system.

To use a virtual media account, the user may place the contactless media associated with the account near a contactless media reader of a transit gate or other transit access controller. The transit gate encrypts the contactless media identifier and communicates the encrypted identifier to the bank card token system 108. The bank card token system 108 may then send the token back to the converter 102 and/or the virtual ticket management system 106. The virtual ticket management system 106 may use the token to look up the account associated with the contactless media. Based on the information in the account, a user may be granted or denied access to the transit system.

In some embodiments, the converter 102 may include a retention bin that is used to store converted and/or erased smartcards. This allows a transit operator to remove smartcards from circulation to aid a transition to other forms of contactless media, as well as to collect the smartcards for recycling. In some transit systems, smartcards include a deposit or recycling incentive. A deposit may be made into the account based on the retention of a smartcard by the converter 102.

The system 100 may also include a device monitoring system 110 in communication with converter 102. The device monitoring system 110 may receive an indication of the status of one or more components of the converter 102. Device monitoring system 110 may also monitor a capacity level of the retention bin of the converter 102. This monitoring enables converter 102 to be serviced and/or the retention bin emptied in a timely manner.

Figure 2:
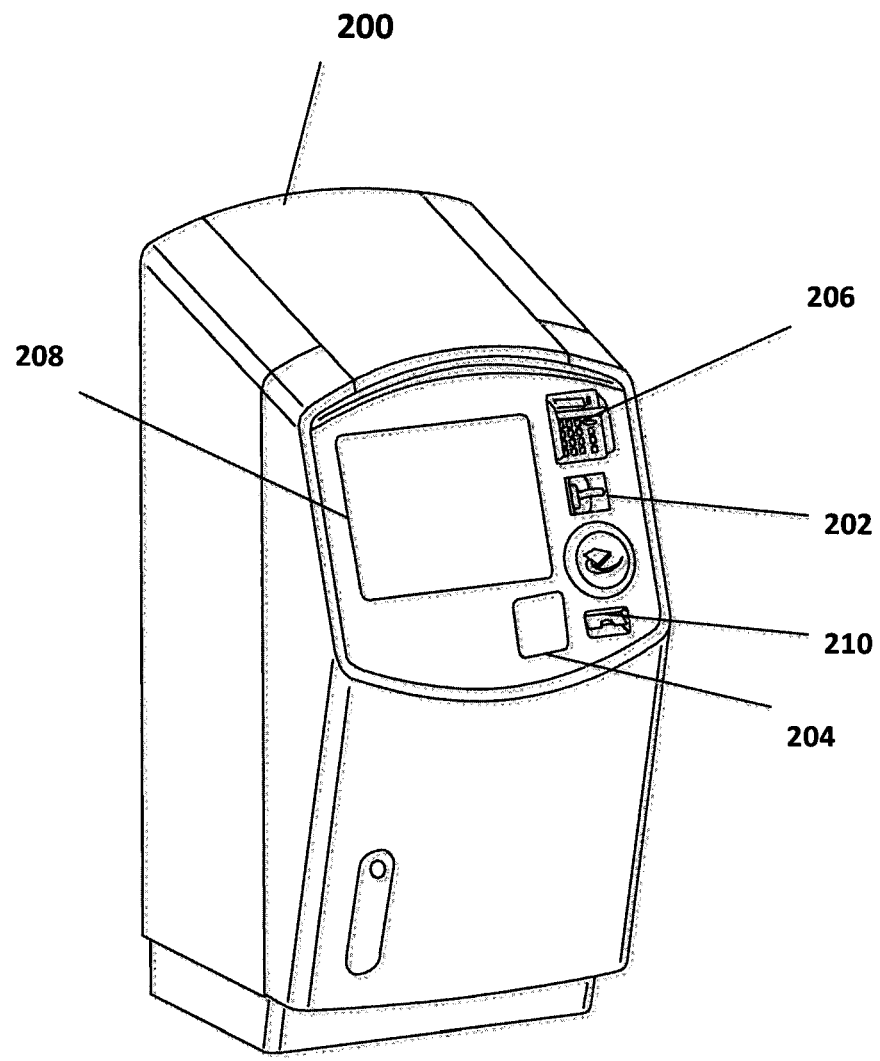
FIG. 2 is a depiction of a smartcard to virtual media converter, according to one embodiment.

FIG. 2 illustrates one embodiments of a smartcard to virtual media converter 200. In some embodiments, converter 200 may be the converter 102 described in FIG. 1. In some embodiments, converter 200 may be a small kiosk or vending machine-like device. In some embodiments, converter 200 may be a wall-mounted device. The converter 200 may include a smartcard reader 202 that is configured to receive a smartcard and to read data stored on the smartcard. The data may include, for example, product information related to one or more transit products stored on the smartcard. In some embodiments, the contactless media reader 204 may include a writing module that may write the token or other information to a contactless media. For example, the writing module may write the product information from the smartcard onto the contactless media. In some embodiments, the writing module may be separate from the contactless media reader 204.

Converter 200 may also include an input interface 206, such as a keyboard or touchscreen, which allows a user to interface with the converter 200. In some embodiments, converter 200 includes a display or screen 208 that presents information that may guide a user through the conversion process and/or provide the user with a status of the converter 200 and/or conversion process. For example, screen 208 may present instructions alerting a user when to insert a smartcard into the smartcard reader 202 and when to place a contactless media near that contactless media reader 204. As another example, screen 208 may also indicate to the user that a problem has occurred and a virtual media account may not be created and/or associated with a particular contactless media. In some embodiments, converter 200 also includes a printer 210 that is configured to print and issue a receipt of the conversion transaction for the user's records. The receipt may include a time and/or date of the transaction, a status of the transaction, a location of the transaction, and/or any other information related to the conversion transaction. In some embodiments, some or all of the functions of the components of the converter 200 may be controlled by one or more processing units (not shown).

In some embodiments, converter 200 also includes a retention bin (not shown). Smartcards inserted into smartcard reader 202 may be retained and collected within the retention bin upon successful conversion of the smartcard to a virtual media account. In some embodiments, converter 200 may be able to convert other types of media as well. For example, converter 200 may include a barcode conversion system, a magnetic card conversion system, and/or any other conversion system for other media types. In this manner, a single converter 200 may be able to convert any transit media into a virtual media that is usable via a contactless media.

Figure 3:
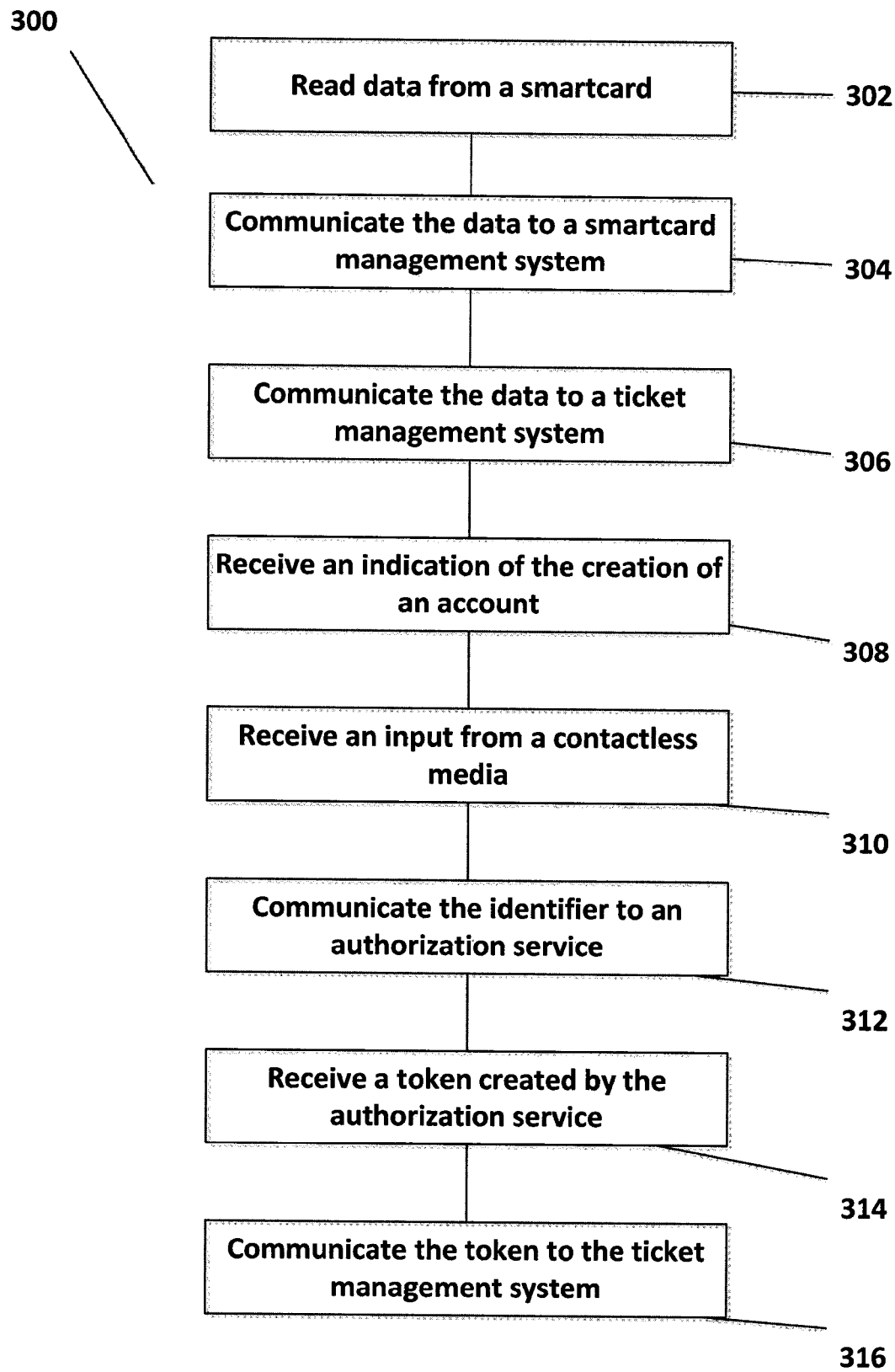
FIG. 3 is a flow diagram illustrating a process of converting a smartcard to virtual media, according to embodiments of the invention.

FIG. 3 illustrates one embodiment of a method 300 for converting a smartcard into a virtual media. The method 300 may include reading data from a smartcard at block 302. The reading of the data may be done using a smartcard reader, such as smartcard reader 202 described in FIG. 2. This data may be stored in a memory of a converter for later use. In some embodiments, the data may be erased from the smartcard. The data may include product information related to a transit product stored on the smartcard. The data to may be communicated to a smartcard management system such that the smartcard management system may create a record of the smartcard at block 304. In some embodiments, smartcard management system 104 of FIG. 1 may create this record. In some embodiments, the method may further include receiving personal information from the smartcard management system. The personal information being related to the data, and may include a name and/or address of the owner of the smartcard. The personal information may be communicated to the ticket management system. At block 306, the data may be communicated to a ticket management system, such as ticket management system 106 of FIG. 1. In some embodiments, the ticket management system may create an account using the received data and/or any personal information from the smartcard management system.

The method may further include receiving an indication of the creation of an account from the ticket management system at block 308. The account may include a unique account identifier as well as the data from the smartcard. The method may also include receiving an input from a contactless media at block 310. The input may include an identifier of the contactless media, such as a credit card number. The identifier may be communicated to an authorization service, such as bank card token service 108 of FIG. 1, at block 312. In some embodiments, the identifier may be encrypted by the converter prior to communication to the authorization service. At block 314, a token created by the authorization service may be received. The token may be associated with the identifier. The token may be communicated to the ticket management system at block 316. In some embodiments, the ticket management system may associate the token with the newly created account. In some embodiments, the token may be written to a portion of the contactless media. In some embodiments, the method may include checking a status of a hardware component of a smartcard to virtual media converter and determining a capacity level of a retention bin of the smartcard to virtual media converter. The status and/or the capacity level may be communicated to a device monitoring system.

Figure 4:
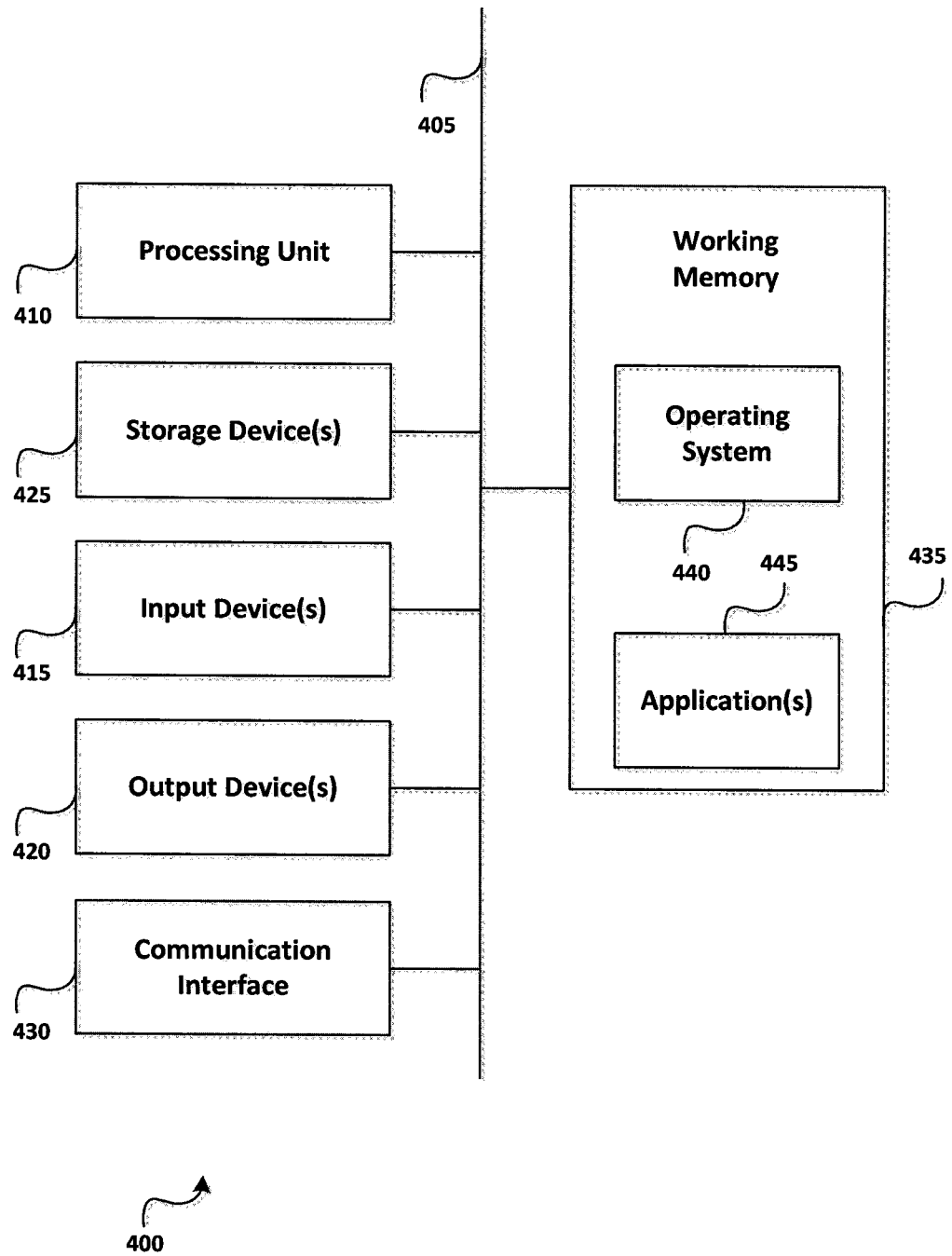
FIG. 4 is a block diagram of an example computing system.

A computer system as illustrated in FIG. 4 may be incorporated as part of the previously described computerized devices. For example, computer system 400 can represent some of the components of the converter 102, smartcard management system 104, virtual ticket management system 106, bank card token service 108, and/or device monitoring system 110 of FIG. 1. Computer system 400 may also represent components of the converter 200 described in FIG. 2. FIG. 4 provides a schematic illustration of one embodiment of a computer system 400 that can perform the methods provided by various other embodiments, as described herein, and/or can function as the host computer system, a remote kiosk/terminal, a point-of-sale device, a mobile device, and/or a computer system. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more general-purpose processors and/or one or more special-purpose processors (such as digital signal processing chips, graphics acceleration processors, and/or the like); one or more input devices 415, which can include without limitation a mouse, a keyboard, a touchscreen, receiver, a motion sensor, a camera, a smartcard reader, a contactless media reader, and/or the like; and one or more output devices 420, which can include without limitation a display device, a speaker, a printer, a writing module, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a non-transitory storage device 425 either before or after execution by the processing unit 410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for converting a smartcard into a virtual media in a transit system, the method comprising:
    reading, by a smartcard converter device, data from a smartcard, wherein the data comprises product information stored on the smartcard;
    communicating, by the smartcard converter device, the data to a smartcard management system;
    communicating, by the smartcard converter device, the data to a ticket management system;
    receiving, by the smartcard converter device, an indication of a creation of an account from the ticket management system,
    erasing, by the smartcard converter device, the data from the smartcard or retaining the smartcard based on receiving the indication;
    sending, by the smartcard converter device, a signal to the smartcard management system based on the erasing the data or the retaining the smartcard;
    receiving, by the smartcard converter device, an input from a contactless media, the input comprising an identifier of the contactless media;
    communicating, by the smartcard converter device, the identifier to an authorization service;
    receiving, by the smartcard converter device, a token from the authorization service; and
    communicating, by the smartcard converter device, the token to the ticket management system.

2. The method for converting a smartcard into a virtual media of claim 1, further comprising:
    receiving, by the smartcard converter device, the smartcard and depositing the smartcard into a retention bin after the data is read.

3. The method for converting a smartcard into a virtual media of claim 2, further comprising:
    checking, by the smartcard converter device, a status of a hardware component of the smartcard converter device;
    determining, by the smartcard converter device, a capacity level of the retention bin; and
    communicating, by the smartcard converter device, the status and the capacity level to a device monitoring system.

4. The method for converting a smartcard into a virtual media of claim 1, wherein:
the product information comprises at least one or more of the group consisting of: a type of pass represented by the transit product, a value of the transit product, a time of purchase of the transit product, a date of purchase of the transit product, an expiration date of the transit product, or a valid date range of the transit product.

5. The method for converting a smartcard into a virtual media of claim 1, further comprising:
receiving, by the smartcard converter device, personal information from the smartcard management system, the personal information being related to the data; and
communicating, by the smartcard converter device, the personal information to the ticket management system, wherein the account further comprises the personal information.

6. The method for converting a smartcard into a virtual media of claim 1, further comprising:
encrypting, by the smartcard converter device, the identifier of the contactless media prior to communicating the identifier to the authorization service.

7. A non-transitory computer-readable medium having instructions embedded thereon for converting a barcode media into a magnetic stripe media in a transit system, the instructions comprising computer code for causing a computing device to execute:
reading, by the smartcard converter device, data from a smartcard, wherein the data comprises product information stored on the smartcard;
communicating, by the smartcard converter device, the data to a smartcard management system;
communicating, by the smartcard converter device, the data to a ticket management system;
receiving, by the smartcard converter device, an indication of a creation of an account from the ticket management system;
receiving, by the smartcard converter device, an input from a contactless media, the input comprising an identifier of the contactless media;
erasing, by the smartcard converter device, the data from the smartcard or retaining the smartcard based on receiving the indication;
sending, by the smartcard converter device, a signal to the smartcard management system based on the erasing the data or the retaining the smartcard;
communicating, by the smartcard converter device, the identifier to an authorization service;
receiving, by the smartcard converter device, a token from the authorization service; and
communicating, by the smartcard converter device, the token to the ticket management system.

8. The non-transitory computer readable medium of claim 7, further comprising instructions for causing the computing device to:
check, by the smartcard converter device, a status of a hardware component of the smartcard converter device;
determine, by the smartcard converter device, a capacity level of a retention bin of the smartcard to virtual media converter; and
communicate, by the smartcard converter device, the status and the capacity level to a device monitoring system.

9. The non-transitory computer readable medium of claim 7, wherein:
the product information comprises at least one or more of the group consisting of: a type of pass represented by the transit product, a value of the transit product, a time of purchase of the transit product, a date of purchase of the transit product, an expiration date of the transit product, or a valid date range of the transit product.

10. The non-transitory computer readable medium of claim 7, further comprising instructions for causing the computing device to:
receive, by the smartcard converter device, personal information from the smartcard management system, the personal information being related to the data; and
communicate, by the smartcard converter device, the personal information to the ticket management system, wherein the account further comprises the personal information.

11. The non-transitory computer readable medium of claim 7, further comprising instructions for causing the computing device to:
encrypt, by the smartcard converter device, the identifier of the contactless media prior to communicating the identifier to the authorization service.

12. A smartcard converter device for converting a smartcard into a virtual media in a transit system, the smartcard converter device comprising:
a smartcard reader configured to execute reading data stored on a smartcard, wherein the data comprises product information stored on the smartcard;
a contactless media reader; and
a processor configured to execute:
receiving the data from the smartcard;
communicating the data to a smartcard management system;
communicating the data to a ticket management system;
receiving an indication of a creation of an account from the ticket management system;
erasing the data from the smartcard or retaining the smartcard based on receiving the indication;
sending a signal to the smartcard management system based on the erasing the data or the retaining the smartcard;
receiving an input from the contactless media using the contactless media reader, the input comprising an identifier of the contactless media;
communicating the identifier to an authorization service;
receiving a token from the authorization service; and
communicating the token to the ticket management system.

13. The smartcard converter device for converting a smartcard into a virtual media of claim 12, further comprising:
a display configured to present information related to a conversion of the smartcard.

14. The smartcard converter device for converting a smartcard into a virtual media of claim 12, wherein the processor is further configured to:
check a status of a hardware component of the system;
determine a capacity level of a retention bin of the smartcard converter device; and
communicate the status and the capacity level to a device monitoring system.

15. The smartcard converter device for converting a smartcard into a virtual media of claim 12, wherein:
the product information comprises at least one or more of the group consisting of: a type of pass represented by the transit product, a value of the transit product, a time of purchase of the transit product, a date of purchase of the transit product, an expiration date of the transit product, or a valid date range of the transit product.

16. The smartcard converter device for converting a smartcard into a virtual media of claim 12, wherein the processor is further configured to:
- receive personal information from the smartcard management system, the personal information being related to the data; and
- communicate the personal information to the ticket management system, wherein the account further comprises the personal information.

17. The smartcard converter device for converting a smartcard into a virtual media of claim 12, further comprising:
- a retention bin configured to receive and retain the smartcard after the data has been read and erased from the smartcard.

18. The smartcard converter device for converting a smartcard into a virtual media of claim 12, wherein the processor is further configured to:
- encrypt the identifier of the contactless media prior to communicating the identifier to the authorization service.

* * * * *

UNITED STATES PATENT AND TRADEMARK OFFICE
CERTIFICATE OF CORRECTION

| | |
|---|---|
| PATENT NO. | : 8,990,117 B2 |
| APPLICATION NO. | : 14/334531 |
| DATED | : March 24, 2015 |
| INVENTOR(S) | : Gavin R. Smith |

It is certified that error appears in the above-identified patent and that said Letters Patent is hereby corrected as shown below:

In the Claims:

Column 10, line 38, please delete "system," and insert --system;--.

Column 11, line 27, please delete "execute".

Column 11, line 28, please delete "reading" and insert --read--.

Column 11, line 31, please delete "communicating" and insert --communicate--.

Column 11, line 33, please delete "communicating" and insert --communicate--.

Column 11, line 35, please delete "receiving" and insert --receive--.

Column 11, line 38, please delete "receiving" and insert --receive--.

Column 11, line 41, please delete "erasing" and insert --erase--.

Column 11, line 44, please delete "sending" and insert --send--.

Column 11, line 47, please delete "communicating" and insert --communicate--.

Column 11, line 49, please delete "receiving" and insert --receive--.

Column 11, line 51, please delete "communicating" and insert --communicate--.

Column 12, line 23, please delete "execute reading" and insert --read--.

Column 12, line 27, please delete "execute".

Column 12, line 28, please delete "receiving" and insert --receive--.

Column 12, line 29, please delete "communicating" and insert --communicate--.

Signed and Sealed this
Twenty-first Day of July, 2015

Michelle K. Lee
*Director of the United States Patent and Trademark Office*

CERTIFICATE OF CORRECTION (continued)
U.S. Pat. No. 8,990,117 B2

In the Claims:

Column 12, line 31, please delete "communicating" and insert --communicate--.

Column 12, line 32, please delete "receiving" and insert --receive--.

Column 12, line 34, please delete "erasing" and insert --erase--.

Column 12, line 36, please delete "sending" and insert --send--.

Column 12, line 39, please delete "receiving" and insert --receive--.

Column 12, line 42, please delete "communicating" and insert --communicate--.

Column 12, line 44, please delete "receiving" and insert --receive--.

Column 12, line 45, please delete "communicating" and insert --communicate--.